United States Patent
Jeon et al.

(10) Patent No.: US 12,087,511 B2
(45) Date of Patent: Sep. 10, 2024

(54) MULTILAYER CERAMIC CAPACITOR

(71) Applicant: SAMSUNG ELECTRO-MECHANICS CO., LTD., Suwon-si (KR)

(72) Inventors: Jong Myeong Jeon, Suwon-si (KR); Ki Yong Lee, Suwon-si (KR); Jin Woo Kim, Suwon-si (KR); Chang Hak Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 168 days.

(21) Appl. No.: 17/852,549

(22) Filed: Jun. 29, 2022

(65) Prior Publication Data
US 2023/0207212 A1    Jun. 29, 2023

(30) Foreign Application Priority Data
Dec. 28, 2021 (KR) .......... 10-2021-0190033

(51) Int. Cl.
*H01G 4/30* (2006.01)
*H01G 4/012* (2006.01)
*H01G 4/12* (2006.01)

(52) U.S. Cl.
CPC .............. *H01G 4/30* (2013.01); *H01G 4/012* (2013.01); *H01G 4/1227* (2013.01)

(58) Field of Classification Search
CPC ........ H01G 4/30; H01G 4/012; H01G 4/1227; H01G 4/33; H01G 4/248; H01G 4/008; H01G 4/2325; H01G 4/1218
See application file for complete search history.

(56) References Cited

U.S. PATENT DOCUMENTS

| | | | |
|---|---|---|---|
| 2013/0321980 A1 | 12/2013 | Suzuki et al. | |
| 2016/0217923 A1* | 7/2016 | Park | C04B 35/638 |
| 2017/0169952 A1* | 6/2017 | Kato | H01G 4/2325 |
| 2018/0261390 A1* | 9/2018 | Sakate | H01G 4/30 |
| 2021/0074479 A1* | 3/2021 | Lee | H01G 4/012 |
| 2021/0202171 A1* | 7/2021 | Tsutsui | H01G 4/012 |

(Continued)

FOREIGN PATENT DOCUMENTS

| | | |
|---|---|---|
| KR | 10-1581925 B1 | 12/2015 |
| KR | 10-2283078 B1 | 7/2021 |

*Primary Examiner* — Michael P McFadden
(74) *Attorney, Agent, or Firm* — Morgan, Lewis & Bockius LLP (57) ABSTRACT

A multilayer ceramic capacitor includes a ceramic body including a dielectric layer and including first and second surfaces opposing each other, third and fourth surfaces connecting the first and second surfaces. A plurality of internal electrodes is disposed inside the ceramic body, connected to the first and second surfaces, and have one ends connected to the third and fourth surfaces. First and second side margin parts are disposed on end portions of the internal electrodes connected to the first and second surfaces. The ceramic body includes an active portion forming capacitance by including the plurality of internal electrodes disposed to oppose each other with the dielectric layer interposed therebetween. An average Sn content in a region adjacent to the side margin part of the active portion is greater than an average Sn content in a central region of the active portion.

23 Claims, 4 Drawing Sheets

(56) References Cited

U.S. PATENT DOCUMENTS

| | | | |
|---|---|---|---|
| 2021/0202181 A1* | 7/2021 | Wakashima | H01G 4/30 |
| 2022/0139630 A1* | 5/2022 | Yamada | H01G 4/008 361/321.2 |

\* cited by examiner

MULTILAYER CERAMIC CAPACITOR

CROSS-REFERENCE TO RELATED APPLICATION

This application claims the benefit of priority to Korean Patent Application No. 10-2021-0190033 filed on Dec. 28, 2021 in the Korean Intellectual Property Office, the disclosure of which is incorporated herein by reference in its entirety.

TECHNICAL FIELD

The present disclosure relates to a multilayer ceramic capacitor.

BACKGROUND

A multilayer ceramic capacitor (MLCC), a multilayer electronic component, is a chip-type condenser mounted on the printed circuit boards of various electronic products such as display devices including liquid crystal displays (LCDs) and plasma display panels (PDPs), computers, smartphones, cell phones, and the like, to allow electricity to be charged therein and discharged therefrom.

The MLCC is a device performing various roles such as blocking, coupling, decoupling, current separation, and energy storage in electronic circuits of electronic devices, and technological competition has been intensified due to increasing demand for miniaturization and high performance.

MLCCs performing various roles require a more stable operation, while being miniaturized and having high performance. Accordingly, there is a need to develop an MLCC having improved moisture resistance reliability and electrical characteristics in order to satisfy the requirements mentioned above, but a technology that satisfies all these high-level requirements has not yet been developed.

SUMMARY

An aspect of the present disclosure may provide a multilayer ceramic capacitor having improved moisture resistance reliability and electrical characteristics.

According to an aspect of the present disclosure, a multilayer ceramic capacitor may include: a ceramic body including a dielectric layer and including first and second surfaces opposing each other, third and fourth surfaces connecting the first and second surfaces, and fifth and sixth surfaces connected to the first to fourth surfaces and opposing each other; a plurality of internal electrodes disposed inside the ceramic body, exposed to the first and second surfaces, and having one ends exposed to the third and fourth surfaces; and first and second side margin parts disposed on end portions of the internal electrodes exposed to the first and second surfaces, wherein the ceramic body includes an active portion forming capacitance by including the plurality of internal electrodes disposed to oppose each other with the dielectric layer interposed therebetween, and an average Sn content in a region adjacent to the side margin part of the active portion is greater than an average Sn content in a central region of the active portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the drawings, an L direction may be understood as a first direction or length direction, a W direction may be understood as a second direction or width direction, and a T direction may be understood as a third direction, a thickness direction, or a stacking direction, but are not limited thereto.

Multilayer Ceramic Capacitor

Figure 1:
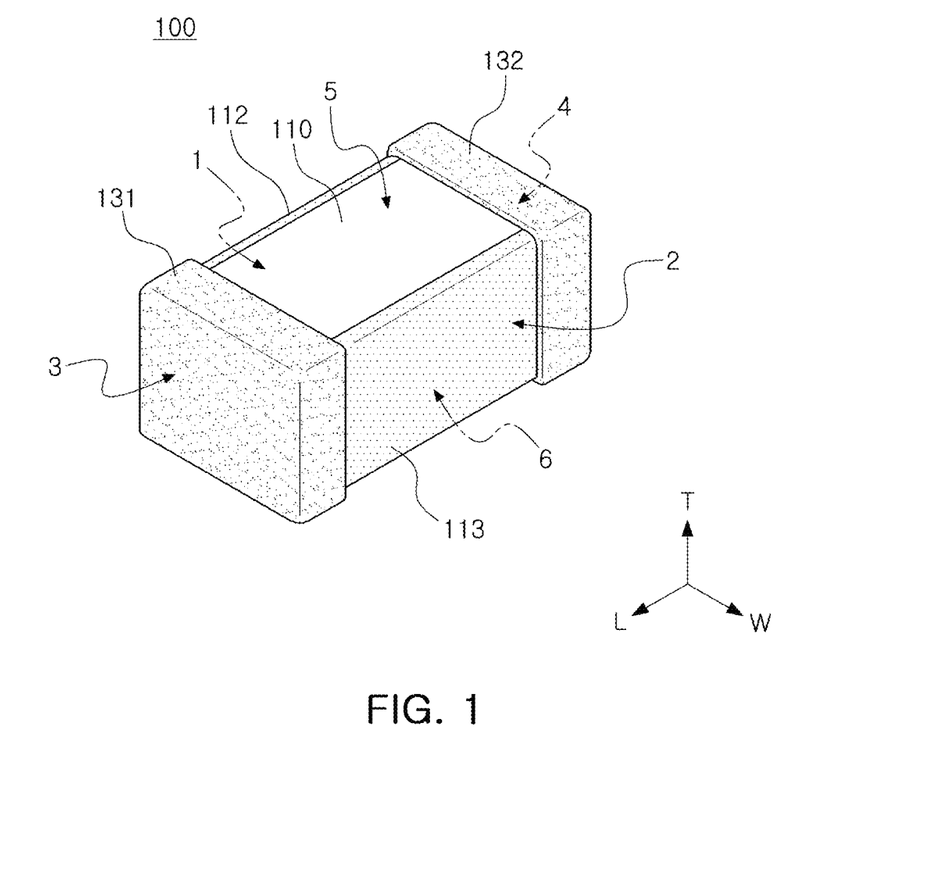
FIG. 1 is a perspective view schematically illustrating a multilayer ceramic capacitor according to an exemplary embodiment in the present disclosure.

FIG. 1 is a perspective view schematically illustrating a multilayer ceramic capacitor according to an exemplary embodiment in the present disclosure.

Figure 2:
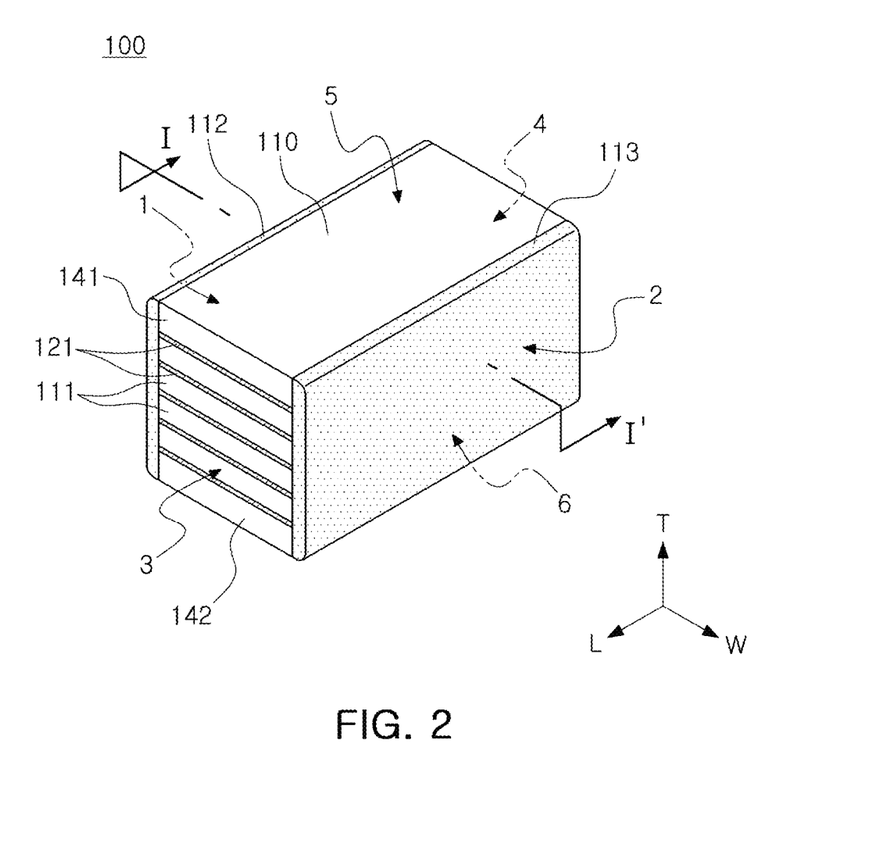
FIG. 2 is a perspective view illustrating an external appearance of a ceramic body of FIG. 1.

FIG. 2 is a perspective view illustrating an external appearance of a ceramic body of FIG. 1.

Figure 3:
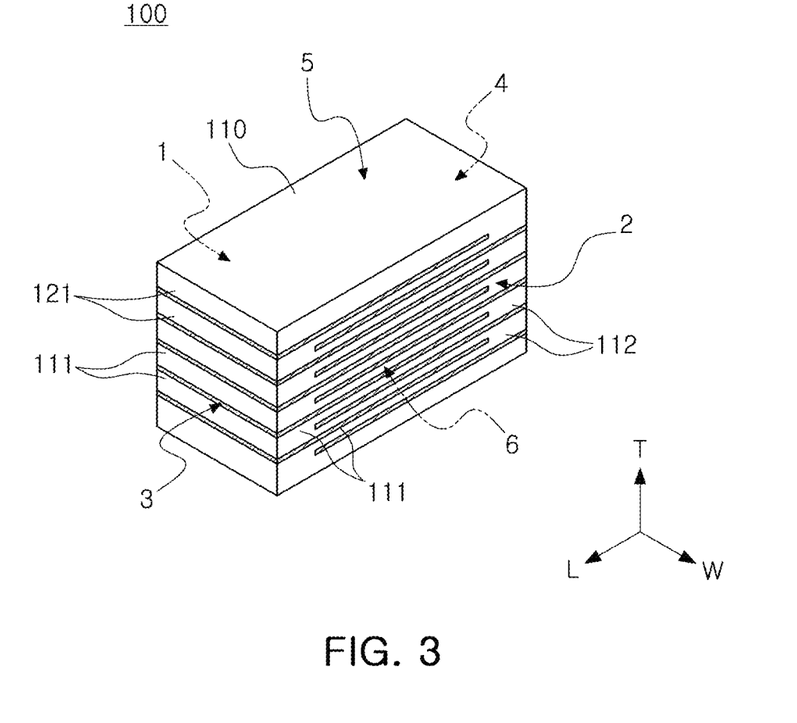
FIG. 3 is a perspective view illustrating a ceramic green sheet stack body of the ceramic body of FIG. 2 before firing.

FIG. 3 is a perspective view illustrating a ceramic green sheet stack body of the ceramic body of FIG. 2 before firing.

Figure 4:
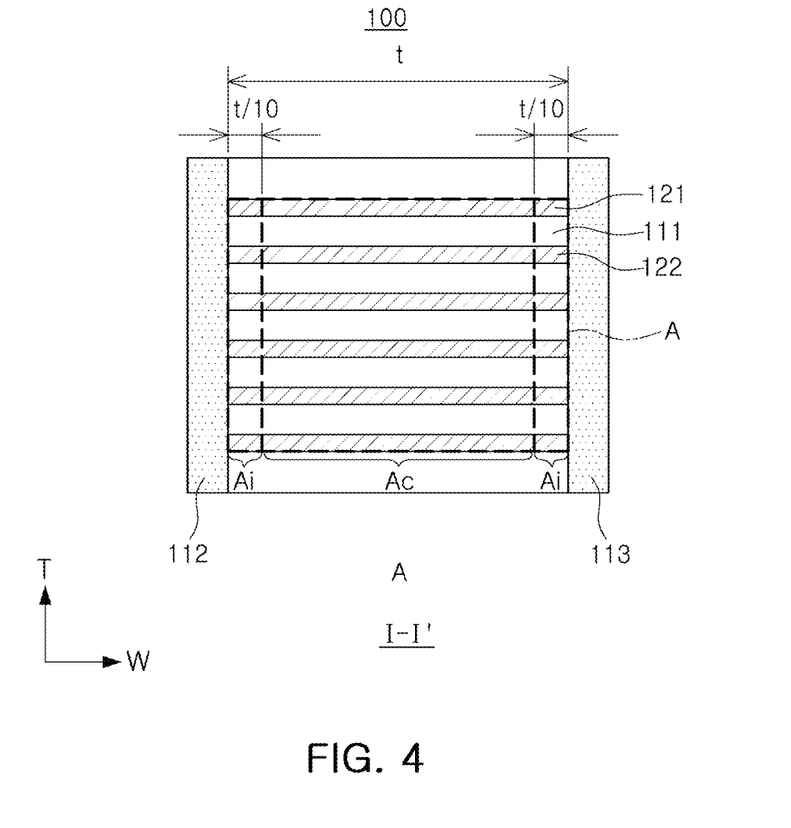
FIG. 4 is a cross-sectional view taken along line I-I' of FIG. 2.

FIG. 4 is a cross-sectional view taken along line I-I' of FIG. 2.

Hereinafter, a multilayer ceramic capacitor according to an exemplary embodiment in the present disclosure will be described in detail with reference to FIGS. 1 to 4.

A multilayer ceramic capacitor (MLCC) 100 according to an exemplary embodiment in the present disclosure includes a ceramic body 110, a plurality of internal electrodes 121 and 122 formed inside the ceramic body 110, and external electrodes 131 and 132 formed on an external surface of the ceramic body 110.

The ceramic body 110 includes a first surface 1 and a second surface 2 opposing each other, a third surface 3 and a fourth surface 4 connecting the first surface and the second surface, and a fifth surface 5 and a sixth surface 6 connected to the first to fourth surfaces and opposing each other.

The first surface 1 and the second surface 2 may be defined as surfaces opposing each other in the width direction W of the ceramic body 110, the third surface 3 and the fourth surface 4 may be defined as surfaces facing in the length direction L, and the fifth and sixth surfaces 5 and 6 may be defined as surfaces opposing each other in the thickness direction T.

Although a specific shape of the ceramic body 110 is not particularly limited, as illustrated, the ceramic body 110 may have a hexahedral shape or a shape similar thereto. Due to shrinkage of ceramic powder particles included in the ceramic body 110 during a firing process, the ceramic body 110 may not have a perfectly straight hexahedral shape but may have a substantially hexahedral shape.

The ceramic body 110 includes a plurality of internal electrodes 121 and 122 and a dielectric layer 111 disposed between the plurality of internal electrodes. In the body, the dielectric layer 111 and the internal electrodes 121 and 122 are alternately stacked.

The plurality of dielectric layers 111 forming the ceramic body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, etc. in which calcium (Ca), zirconium (Zr), or the like is partially dissolved in $BaTiO_3$, $BaTiO_3$.

As a material for forming the dielectric layer 111, various ceramic additives, organic solvents, binders, dispersants, etc. may be added to the powder particles such as barium titanate ($BaTiO_3$) according to purposes of the present disclosure.

The internal electrodes 121 and 122 may be alternately disposed with the dielectric layer 111 in the thickness direction (the Z direction). The internal electrodes may include a first internal electrode 121 and a second internal electrode 122. The first and second internal electrodes 121 and 122 may be alternately disposed to oppose each other with the dielectric layer 111 constituting the ceramic body 110 interposed therebetween, and one ends of the first and second internal electrodes 121 and 122 may be exposed to the third and fourth surfaces 3 and 4 of the ceramic body 110, respectively. The first and second internal electrodes 121 and 122 may be a pair of a first internal electrode 121 and a second internal electrode 122 having different polarities.

Referring to FIG. 3, the first internal electrode 121 may be spaced apart from the fourth surface 4 and may be exposed through the third surface 3, and the second internal electrode 122 may be spaced apart from the third surface 3 and may be exposed through the fourth surface 4.

That is, the first and second internal electrodes 121 and 122 are alternately exposed to the third surface 3 and the fourth surface 4 that are both end surfaces of the body in the length direction (X direction), respectively, and the first external electrode 131 may be formed on the third surface 3 of the ceramic body 110 to be electrically connected to the first internal electrode 121. In addition, the second external electrode 132 may be formed on the fourth surface 4 of the ceramic body 110 to be electrically connected to the second internal electrode 122.

Accordingly, the first internal electrode 121 is not connected to the second external electrode 132 but is connected to the first external electrode 131, and the second internal electrode 122 is not connected to the first external electrode 131 but is connected to the second external electrode 132. Accordingly, the first internal electrode 121 is formed to be spaced apart from the fourth surface 4 by a predetermined distance, and the second internal electrode 122 is formed to be spaced apart from the third surface 3 by a predetermined distance. In this case, the first and second internal electrodes 121 and 122 may be electrically separated from each other by the dielectric layer 111 disposed therebetween.

A material for forming the first and second internal electrodes 121 and 122 is not particularly limited, and the first and second internal electrodes 121 and 122 may be formed using a conductive paste including noble metal materials such as palladium (Pd), palladium-silver (Pd—Ag) alloy, and one or more of nickel (Ni) and copper (Cu).

As a method for printing the conductive paste, a screen printing method or a gravure printing method may be used, and the present disclosure is not limited thereto.

The multilayer ceramic capacitor 100 according to an exemplary embodiment in the present disclosure includes a plurality of internal electrodes 121 and 122 disposed inside the ceramic body 110 and exposed through the first surface 1 and the second surface 2, and having one ends exposed to the third surface 3 or the fourth surface 4; and a first side margin part 112 and a second side margin part 113 disposed on ends of the internal electrode exposed to the first surface 1 and the second surface 2.

A plurality of internal electrodes 121 and 122 are formed inside the ceramic body 110, and each end of the plurality of internal electrodes 121 and 122 is exposed to the first surface and the second surface 2, which are surfaces of the ceramic body 110 in the width direction W, and the first side margin part 112 and the second side margin part 113 are respectively disposed on the exposed ends.

That is, the ceramic body 110 may include a stack in which a plurality of dielectric layers 111 are stacked, and a first side margin part 112 and a second side margin part 113 disposed on both side surfaces of the stack in the width direction W.

According to an exemplary embodiment in the present disclosure, a length of the ceramic body 110 corresponds to a distance from the third surface 3 to the fourth surface 4 of the ceramic body. Although not limited thereto, the length of the ceramic body may be in a range from 300 μm to 1400 μm.

The internal electrodes 121 and 122 may be formed on the dielectric layer 111, and the internal electrodes 121 and 122 may be formed inside the ceramic body 110 with a dielectric layer interposed therebetween by sintering.

Referring to FIG. 3, the first internal electrode 121 is formed on the dielectric layer 111. The first internal electrode 121 is not entirely formed in the length direction L of the dielectric layer. That is, one end of the first internal electrode 121 may be formed at a predetermined distance from the fourth surface 4 of the ceramic body, and the other end of the first internal electrode 121 may be formed up to the third surface 3 and may be exposed to the third surface 3.

An end of the first internal electrode 121 exposed to the third surface 3 of the ceramic body 110 is connected to the first external electrode 131.

On the other hand, one end of the second internal electrode 122 is formed at a predetermined distance from the third surface 3, and the other end of the second internal electrode 122 is exposed to the fourth surface 4 and is connected to the second external electrode 132.

The internal electrode may be stacked 200 or more layers to realize a high-capacitance multilayer ceramic capacitor, but is not limited thereto.

The dielectric layer 111 may have the same width as that of the first internal electrode 121. That is, the first internal electrode 121 may be formed entirely in the width direction W of the dielectric layer 111.

Although not limited thereto, according to an exemplary embodiment in the present disclosure, the width of the dielectric layer and the width of the internal electrode may be in a range from 100 μm to 900 μm.

The ceramic body 110 includes an active portion A, which is a part contributing to capacitance formation of the capacitor. That is, the active portion includes a plurality of internal electrodes disposed to oppose each other with the dielectric layer interposed therebetween to form capacitance.

Also, the ceramic body 110 may include upper and lower cover parts 141 and 142 together with the active portion A described above.

The upper cover part 141 and the lower cover part 142 may be formed by stacking a single dielectric layer or two or more dielectric layers on the upper and lower surfaces of the active portion in the stacking direction T and may basically prevent damage to the internal electrodes caused by physical or chemical stress.

Accordingly, the upper and lower cover parts 141 and 142 may have the same material and configuration as the dielectric layer 111 except that they do not include internal electrodes.

That is, the upper and lower cover parts 141 and 142 may include a ceramic material, for example, a barium titanate ($BaTiO_3$)-based ceramic material.

In addition, the upper and lower cover parts 141 and 142 may each have a thickness of 20 μm or less, but are not limited thereto.

Meanwhile, as demand for miniaturization and high capacitance has intensified in recent years, it has become important for the multilayer ceramic capacitor to achieve stable performance. Accordingly, the present inventors conducted intensive research to improve not only the moisture resistance reliability of the multilayer ceramic capacitor but also the electrical characteristics. The present disclosure is the result of the discovery that a behavior of the Sn component in the capacitance forming portion (e.g., active portion A illustrated in FIG. 4) of the multilayer ceramic capacitor is an important factor for improving these characteristics.

Specifically, although Sn diffusion occurs even in a single dielectric grain, an overall diffusion behavior of Sn in the active portion A, was found to have a significant impact on the characteristics of the multilayer ceramic capacitor.

In addition, based on that the moisture resistance reliability and IR dispersion are improved when Sn is added to the first and second side margin parts 112 and 113 in addition to the addition of Sn to the active portion A, it was confirmed that a change in Sn diffusion behavior in the overall multilayer ceramic capacitor causes changes in electrical characteristics and reliability.

First, the diffusion behavior of the Sn component in the active portion A will be described. According to an exemplary embodiment in the present disclosure, as shown in FIG. 4, the active portion A includes a side border region Ai adjacent the side margin part and a central region Ac of the active portion.

In this case, when the shortest distance from the first side margin part 112 to the second side margin part 113 is t, the side border region Ai of the active portion refers to a region from an interface between any one of the first side margin part 112 and the second side margin part 113 and the active portion A to a point of t/10.

Also, the central region Ac of the active portion may represent a region excluding the side border region Ai. Accordingly, the central region Ac of the active portion may refer to a region from the point of t/10 from any one of the first side margin part 112 and the second side margin part 113 to a point 9t/10.

Meanwhile, when Sn is added in the dielectric of the multilayer ceramic capacitor, a high concentration shell layer of Sn and Dy is present in grains. Sn and Dy present in the shell layer may increase the amount of grain boundaries through overall dielectric grain growth control to increase grain boundary resistance and improve reliability by increasing a size of the Schottky barrier in a core layer present as $BaTiO_3$ and the shell layer, which is $BaTiO_3$ doped with Sn and Dy.

However, the addition of Sn to the first and second side margin parts changes a diffusion behavior of Sn in the active portion of the multilayer ceramic capacitor, which maintains the Sn content in the active portion above a certain level, thereby improving reliability and IR dispersion.

As a result of conducting intensive research, the present inventors found that moisture resistance reliability was improved when the Sn content is high in the side border region Ai in the active portion adjacent to the side margin parts 112 and 113.

Specifically, when Sn is added to a gap sheet, which is a base material for forming a side margin part, Sn is diffused from the side margin part to the active portion, generating a concentration gradient in the form of a gradual increase in the Sn content from the central region Ac of the active portion toward the side border region Ai.

As such, in the width direction W within the active portion, a concentration gradient in which the Sn content gradually increases from the central region Ac toward the side border region Ai is formed, so that a difference in the lattice constant also gradually increases and strain of the interface is controlled not to increase. In addition, since Sn has a grain growth control effect, many grain boundaries are generated, so that coupling between the active portion and the side margin part is well formed due to the effect of reducing strain therethrough. Accordingly, it is determined that a moisture permeation path in the multilayer ceramic capacitor is reduced and the moisture resistance reliability is improved.

Meanwhile, when Sn is not added to the side margin part, the Sn content at each position in the active portion is different from the case in which Sn is added to the side margin part described above, and this is because the diffusion behavior of Sn works in the opposite manner.

Accordingly, when Sn is not added to the gap sheet, which is a base material for forming the side margin part, the Sn content gradually decreases from the central region Ac of the active portion toward the side border region Ai, which is the opposite to the case in which the Sn is added to the gap sheet.

As such, when the Sn content gradually decreases from the central region Ac to the side border region Ai in the width direction W of the active portion, Dy occupies a large proportion relatively to Sn in the interface region of the active portion and the side margin part, causing a difference in lattice constant. Therefore, since grain growth may increase, the number of grain boundaries may be reduced, and thus the effect of strain relaxation is also reduced. For this reason, a relatively large number of moisture permeation paths are generated in the multilayer ceramic capacitor, degrading the moisture resistance reliability.

Moreover, in terms of IR dispersion, Sn is added to the side margin part and Sn diffusion to the active portion is controlled to be maintained to a predetermined level or higher, so that a Schottky barrier is maintained to a predetermined level in the shell layer, thus reducing dispersion.

Meanwhile, when Sn is not added to the side margin part, Sn in the dielectric in the active portion diffuses to a certain level toward the side margin part and also diffuses toward the internal electrode interface, so that the Sn content in the dielectric decreases to reduce influence of Sn in the shell layer, thus increasing the dispersion.

Accordingly, in the present disclosure, the Sn content in the active portion is controlled to a certain level or higher, and specifically, an average Sn content in the side border region Ai of the active portion A is controlled to be greater than an average Sn content in the central region Ac of the active portion. As such, in addition to adding Sn to the side margin parts 112 and 113, the Sn diffusion behavior in the active portion A may be controlled to thereby improve the IR dispersion, as well as the moisture resistance reliability.

Meanwhile, according to an exemplary embodiment in the present disclosure, the multilayer ceramic capacitor may satisfy Relational expression 1 below. As shown in Relational expression 1 below, in the active portion, the Sn content gradually increases from the central region Ac toward the side border region Ai in the width direction W, so that moisture resistance reliability and IR dispersion may be improved according to the same mechanism as described above.

$$W1<W2<W3 \qquad \text{[Relational Expression 1]}$$

(In Relational expression 1, when the shortest distance from the first side margin part to the second side margin part is t, W1 represents an Sn content at a point of t/2 from an interface between any one of the first and second side margin parts and the active portion. Also, W2 represents an Sn content at a point of t/10 from an interface between any one of the first and second side margin parts and the active portion. Also, W3 represents an Sn content at the interface between the first and second side margin parts and the active portion.)

According to an exemplary embodiment in the present disclosure, an average Dy content in the side border region Ai of the active portion may be less than an average Dy content at the central region Ac of the active portion. Meanwhile, although not particularly limited, the present inventors found that a diffusion behavior of Dy in the width direction (W) of the active portion is opposite to that of Sn. That is, the Dy content gradually decreases from the central region Ac of the active portion toward the side border region Ai of the active portion, and by satisfying this, moisture resistance reliability and electrical characteristics may be further improved.

In addition, according to an exemplary embodiment in the present disclosure, the present inventors conducted additional research and found that controlling the aforementioned ratio of Sn and Dy in the side border region Ai of the active portion is an important factor to improve the performance of the multilayer ceramic capacitor. That is, a molar ratio of Dy/Sn in the side border region Ai of the active portion A may be 1.74 or less (or 0<Dy/Sn≤1.74).

In addition, according to an exemplary embodiment in the present disclosure, in the central region Ac of the active portion, an average Sn content in the dielectric layer is 0.75 moles or greater (or 0.75 to 1.4 moles) with respect to 100 moles of barium titanate, which is a main component of the dielectric layer. Alternatively, in the central region Ac of the active portion, an average total content of Sn and Dy in the dielectric layer may be 2 moles or greater with respect to 100 moles of barium titanate, which is a main component of the dielectric layer. By satisfying this, IR dispersion may be reduced and electrical characteristics may be further improved.

In the case of a general multilayer ceramic capacitor, a ceramic body including an active portion in which internal electrodes overlap to form capacitance and a margin part in which internal electrodes do not overlap or an internal electrode is not formed is manufactured. Accordingly, since ceramic green sheets having the same dielectric composition are stacked to form the active portion and the part in which an internal electrode is not formed, a dielectric composition of the active portion and a dielectric composition of the margin part are generally the same.

Therefore, in the case of such a conventional multilayer ceramic capacitor, since the ceramic body including the active portion and the margin part is manufactured by stacking ceramic green sheets having the same dielectric composition, the dielectric composition of both regions cannot be applied differently.

However, in order to implement the multilayer ceramic capacitor according to an exemplary embodiment in the present disclosure, when the multilayer ceramic capacitor is manufactured, as shown in FIG. 3, the internal electrodes are designed to be exposed in the width direction of the body, thereby maximizing the area of the internal electrodes in the width direction W through a design without a margin. However, when manufacturing the multilayer ceramic capacitor according to the present disclosure, a method of separately attaching the margin parts 112 and 113 to the exposed surfaces of the electrodes in the width direction W of the chip in an operation before firing after the chip is manufactured is applied.

However, as described above, when manufacturing the multilayer ceramic capacitor, in the related art, the dielectric composition of the ceramic body is used as it is, without differentiating the dielectric composition for forming the side margin part from the dielectric composition of the ceramic body. Accordingly, in the related art, the dielectric composition is the same in both the side margin part and the ceramic body and is not applied differently.

Alternatively, even if the dielectric composition for forming the side margin part is applied differently, in the related art, the dielectric layer of the active portion does not contain Sn, or contains only a very small amount. However, the present inventors found that, as in the related art, when Sn is not included or a very small amount is included in the dielectric layer of the active portion, there is a limit in the level of reliability that may be secured.

Accordingly, in the present disclosure, by actively controlling the dielectric layer, in the central region Ac of the active portion, to include a large amount of Sn to be 0.6 mol or greater, thereby improving even electrical characteristics, as well as moisture resistance reliability.

The first side margin part 112 and the second side margin part 113 may be disposed on the ends of the internal electrodes 121 and 122 exposed to the first surface 1 and the second surface 2. Accordingly, the first side margin part 112 may be disposed on the first surface 1 that is one side surface of the exposed ceramic body 110 at the ends of the internal electrodes 121 and 122 in the width direction W, and the second side margin part 113 may be disposed on the second surface 2 that is another side surface in the width direction W.

As shown in FIG. 4, the first and second side margin parts 112 and 113 may refer to regions between both ends of the first and second internal electrodes 121 and 122 and a boundary surface of the ceramic body 110 in a cross-section of the ceramic body 110 cut in the width-thickness (W-T) direction.

The first and second side margin parts 112 and 113 may basically serve to prevent damage to the internal electrodes due to physical or chemical stress.

As a method of forming the first and second side margin parts 112 and 113, the internal electrodes 121 and 122 and the dielectric layer 111 are stacked, and then cut such that the internal electrodes 121 and 122 are exposed to the first and second surfaces 1 and 2 of the ceramic body. Next, a single dielectric layer or two or more dielectric layers may be stacked on both side surfaces of the active portion in the width direction W to form the first and second side margin parts 112 and 113.

Accordingly, in an exemplary embodiment in the present disclosure, since the internal electrodes and the dielectric layer are simultaneously cut and formed, a width of the internal electrodes and a width of the dielectric layer may be the same.

In the present exemplary embodiment, the width of the dielectric layer is formed to be the same as the width of the internal electrodes, so that the ends of the internal electrodes 121 and 122 may be exposed to the first and second surfaces 1 and 2 of the ceramic body 110 in the width direction.

Meanwhile, according to an exemplary embodiment in the present disclosure, the first side margin part and the second side margin part may include Sn. As described above, whether Sn is added to the side margin parts 112 and 113 is an important factor in the Sn diffusion behavior in the width direction W within the active portion A. Accordingly, in an exemplary embodiment in the present disclosure, Sn may be added to a gap sheet, a base material for forming side margin parts, during a manufacturing process, so that Sn may be included in the side margin parts 112 and 113.

According to an exemplary embodiment in the present disclosure, the average Sn content in the first and second side margin parts is 1.0 mole or more (e.g., in a range from 1.0 to 3.0 moles) with respect to 100 moles of barium titanate, which is the main component of the first and second side margin parts. Since the addition of Sn to the side margin parts 112 and 113 affects the Sn diffusion behavior in the active portion, Sn may be controlled within the appropriate range described above to improve the desired moisture resistance reliability and electrical characteristics.

In addition, according to an exemplary embodiment in the present disclosure, the average Sn content in the dielectric layer of the active portion A may be 1.0 mole or more with respect to 100 moles of barium titanate, which is a main component of the dielectric layer. By satisfying this, electrical reliability of the multilayer ceramic capacitor may be further improved.

In this case, the average Sn content in the dielectric layer of the active portion A refers to an average value of Sn content in the dielectric layer in the entire region of the active portion.

Therefore, in the case of measuring the average Sn content in the dielectric layer of the active portion A, an average value of the Sn content in the entire region including the central region Ac of the active portion and the side border region Ai of the active portion, rather than being limited to only one of the central region Ac of the active portion and the side border region Ai of the active portion, may be obtained.

Therefore, as an example, as for the measurement of the average Sn content in the dielectric layer of the active portion A, the average value of the Sn content may be obtained by measuring the Sn content in ten points at equal intervals on the same line in the width direction W based on the total length t in a cross-section cut in the width-thickness (W-T) direction so that the active portion of the multilayer ceramic capacitor is observed.

According to an exemplary embodiment in the present disclosure, the average Sn content in the first and second side margin parts may be 1 to 3 times the average Sn content in the dielectric layer of the active portion. By satisfying this, electrical reliability and moisture resistance reliability may be further strengthened.

Alternatively, according to an exemplary embodiment in the present disclosure, in the multilayer ceramic capacitor, when the dielectric layer is a thin film having a thickness of 400 nm or less, the electrical characteristics of electrical stability and IR dispersion improvement are strengthened and the moisture resistance reliability may also be improved when the average Sn content in the first and second side margin parts is 1 to 1.5 times the average Sn content in the dielectric layer of the active portion A.

Although not limited thereto, an average thickness of the first side margin part 112 and the second side margin part 113 may be 15 μm or less. As the average thickness of the first side margin part 112 and the second side margin part 113 decreases, an overlapping area of the internal electrodes formed in the ceramic body may be relatively large. Therefore, by satisfying the aforementioned average thickness range of the first side margin part 112 and the second side margin part 113, the overlapping area of the internal electrodes forming capacitance may be maximized, so that high capacitance and small-sized multilayer ceramic capacitor may be implemented.

A lower limit of the average thickness of the first side margin part 112 and the second side margin part 113 is not particularly limited as long as it has an average thickness capable of preventing a short circuit of the internal electrodes exposed to the side surface of the ceramic body 110, and, for example, the average thickness of the first side margin part 112 and the second side margin part 113 may be 2 μm or more.

Meanwhile, as shown in FIG. 4, the average thickness of the first side margin part 112 and the second side margin part 113 may refer to an average value of thicknesses of the first and second side margin parts measured in a direction perpendicular to the first and second surfaces, after capturing an image of a cross-section of the ceramic body 110 cut in a width-thickness (W-T) direction with a scanning electron microscope (SEM).

In order to maximize capacitance of the multilayer ceramic capacitor, a method of thinning the dielectric layer, a method of highly stacking the thinned dielectric layer, a method of improving coverage of the internal electrodes, or a method of improving an overlapping area of the internal electrodes forming capacitance are considered. Among them, in order to improve the overlapping area of the internal electrodes, the region of the margin parts in which the internal electrodes are not formed should be minimized. In particular, in order to increase the overlapping regions of the internal electrodes as the multilayer ceramic capacitor becomes smaller, the region of the margin parts should be minimized.

Therefore, according to the present exemplary embodiment, the internal electrodes are formed on the entire dielectric layer in the width direction and the thickness of the side margin is set to 15 μm or less, so that the overlapping area of the internal electrodes is large.

In general, as the dielectric layers are increasingly stacked, the thickness of the dielectric layers and the internal electrodes is reduced. Accordingly, a phenomenon in which the internal electrode is shorted may occur frequently. In addition, when the internal electrode is formed only on a part of the dielectric layer, a step may occur due to the internal electrode, thereby reducing the accelerated life or reliability of the insulation resistance.

However, according to the present exemplary embodiment, even when the thin-film internal electrodes and dielectric layers are formed, since the internal electrodes are formed on the entire dielectric layer in the width direction, the overlapping area of the internal electrodes is increased, so that capacitance of the multilayer ceramic capacitor may be increased.

In addition, since the accelerated life of insulation resistance is improved by reducing a step difference based on the internal electrode, a multilayer ceramic capacitor having excellent capacitance characteristics and excellent reliability may be provided.

The external electrodes 131 and 132 are disposed on the ceramic body 110 and are connected to the internal electrodes 121 and 122.

As shown in FIG. 3, the first and second external electrodes 131 and 132 may be disposed on the third and fourth surfaces 3 and 4 of the ceramic body 110 and connected to the first and second internal electrodes 121 and 122, respectively.

In the present exemplary embodiment, a structure in which the multilayer ceramic capacitor 100 has two external electrodes 131 and 132 is described, but the number and shape of the external electrodes 131 and 132 may be changed according to a shape of the internal electrodes 121 and 122 or other purposes.

Meanwhile, the external electrodes 131 and 132 may be formed using any material as long as the material has electrical conductivity, such as metal or the like, and specific materials may be determined in consideration of electrical characteristics and structural stability, and furthermore, the external electrodes 131 and 132 may have a multilayer structure.

For example, the external electrodes 131 and 132 may include an electrode layer disposed on the ceramic body 110 and a plating layer formed on the electrode layer. That is, the electrode layer may include conductive metal and glass, and specifically, may be a fired electrode including a conductive metal and glass or a resin-based electrode including a conductive metal and a resin.

In addition, the electrode layer may have a form in which a fired electrode and a resin-based electrode are sequentially formed on a body. In addition, the electrode layer may be formed by transferring a sheet including a conductive metal onto the body or by transferring a sheet including a conductive metal onto the fired electrode.

As the conductive metal included in the electrode layer, a material having excellent electrical conductivity may be used, but is not particularly limited. For example, the conductive metal may be one or more of nickel (Ni), copper (Cu), and alloys thereof.

The plating layer serves to improve mounting characteristics. A type of the plating layer is not particularly limited, and may be a plating layer including at least one of Ni, Sn, Pd, and alloys thereof, and may be formed of a plurality of layers.

As a more specific example of the plating layer, the plating layer may be a Ni plating layer or a Sn plating layer, and in particular, a Sn plating layer. Alternatively, the plating layer may have a form in which a Ni plating layer and a Sn plating layer are sequentially formed on the electrode layer, and a Sn plating layer, a Ni plating layer, and a Sn plating layer are sequentially formed on the electrode layer. Further, the plating layer may include a plurality of Ni plating layers and/or a plurality of Sn plating layers.

A size of the multilayer electronic component 100 does not need to be particularly limited. However, in order to achieve both miniaturization and high capacitance, it is necessary to increase the number of stacking by reducing the thickness of the dielectric layer and the internal electrodes, and thus, the reliability improvement effect according to the present disclosure may be more remarkable in a multilayer electronic component 100 having a 0402 size (length×width, 0.4 mm×0.2 mm) or less.

Accordingly, in consideration of manufacturing errors and external electrode sizes, the reliability improvement effect according to the present disclosure may be more remarkable when the multilayer electronic component 100 has a length of 0.44 mm or less and a width of 0.22 mm or less. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

Hereinafter, the present disclosure will be described in more detail through examples. However, it is necessary to note that the following examples are only for explaining the present disclosure by way of illustration, and not for limiting the scope of the present disclosure. This is because the scope of the present disclosure is determined by the matters described in the claims and matters reasonably inferred therefrom.

Experimental Example 1

A ceramic paste including Sn was formed, a ceramic green sheet was formed on a PET film using the ceramic paste, Ni internal electrode paste was printed on the ceramic green sheet, and the ceramic green sheets were alternately stacked to form a stack. The stack was cut such that internal electrodes were exposed to the first and second surfaces of a ceramic body. Then, gap sheets with and without the addition of Sn were manufactured and stacked on the exposed cut surfaces (i.e., on both side surfaces in the width direction W).

Thereafter, a firing time and intensity were controlled to satisfy the conditions of Table 1 below, thereby manufacturing a multilayer ceramic capacitor. Next, as shown in FIG. 4, a cross-sectional sample was prepared by cutting the multilayer ceramic capacitor so that a cross-section in the width-thickness (W-T) direction was observed, and the values in Table 1 below were measured and described for the cross-sectional sample.

At this time, with respect to each sample, as for an average Sn content in the dielectric layer (including both Ac and Ai regions) of the active portion with respect to 100 moles of barium titanate, which is a main component of the dielectric layer, Sn content was measured at ten points at equal intervals on the same line in the width direction W in the entire dielectric layer of the active portion of the cross-sectional specimen in the width direction using a TEM-EDS and then averaged.

In addition, with respect to each specimen, as for an average Sn content in the first and second side margin parts with respect to 100 moles of barium titanate, which is a main component of the first and second side margin parts, an Sn content was measured at ten points at equal intervals on the same line in the width direction W using a TEM-EDS and then averaged.

In addition, for each specimen, as for an average Sn content and an average Dy content in the central region Ac of the active portion with respect to 100 moles of barium titanate, which is a main component of the dielectric layer, the content of each component of Sn and Dy was measured at ten points at equal intervals on the same line in the width direction W in the dielectric layer in the central region Ac (a region from a point of t/10 from any one of the first side margin part 112 and the second side margin part 113 to a point of 9t/10 when the shortest distance from the first side margin part 112 to the second side margin part 113 is t) of the active portion of the cross-sectional specimen, using a TEM-EDS and then averaged.

In addition, for each specimen, as for an average Sn content and Dy content in the side border region (Ai) of the active portion with respect to 100 moles of barium titanate, which is a main component of the dielectric layer, a content of each component of Sn and Dy was measured at ten points at equal intervals on the same line in the width direction W in the dielectric layer, in the side border region Ai (region to a point of t/10 from an interface between any one of the first side margin part 112 and the second side margin part 113 and the active portion A when the shortest distance from the first side margin part 112 to the second side margin part 113 is t) of the active portion of the cross-sectional specimen, using a TEM-EDS and then averaged.

In addition, for each specimen, when the shortest distance from the first side margin part to the second side margin part is t, W1 (Sn content at a point of t/2 from an interface between any one of the first and second side margin parts and the active portion A), W2 (Sn content at a point of t/10 from the interface between any one of the first and second side margin parts and the active portion A), and W3 (Sn content in the interface between any one of the first and second side margin parts and the active portion) were measured using a TEM-EDS.

Based on the values of W1, W2, and W3 obtained in this manner, it is evaluated whether or not Relational expression 1 [W1<W2<W3] is satisfied, and a case of satisfaction is indicated by 'o', and a case of non-satisfaction is indicated as 'x' in Table 1 below.

Thereafter, electrical characteristics and moisture resistance reliability of each specimen were evaluated by the following method.

<Electrical Characteristics>

At a high temperature of 115° C., initial IR and late IR after a specific time were measured to obtain a coefficient of variation (CV) value obtained by dividing the standard deviation of each IR by the average, and evaluated according to the following criteria.

Large: CV value of 0.22 or higher

Small: CV value less than 0.22

<Moisture Resistance Reliability>

100 identical sample chips for each specimen were prepared and treated for 3 hours at a temperature of 85° C. and a humidity of 85%, and whether or not chip characteristics were effective were tested, and a case in which chips that did not pass the test for chip characteristics was evaluated as 'x', a case which chips pass all was evaluated as 'o'.

TABLE 1

| Test specimen No. | No. 1 | | No. 2 | |
| --- | --- | --- | --- | --- |
| Average Sn content in dielectric layer (Ac + Ai) of active portion with respect to 100 moles of barium titanate | 1 mol % | | 1 mol % | |
| Average Sn content in first and second side margin parts with respect to 100 moles of barium titanate | 0 mol % | | 3 mol % | |
| Position | Dielectric layer in central region (Ac) of active portion | Dielectric layer in side border region (Ai) of active portion | Dielectric layer in central region (Ac) of active portion | Dielectric layer in side border region (Ai) of active portion |
| Sn | 0.73 moles | 0.70 moles | 0.80 moles | 0.84 moles |
| Dy | 1.17 moles | 1.23 moles | 1.31 moles | 1.16 moles |
| Dy/Sn (molar ratio) | 1.61 | 1.75 | 1.63 | 1.39 |
| Whether Relational Expression 1 is satisfied [W1 < W2 < W3] | X | | ○ | |
| IR dispersion | Large | Large | Small | Small |
| Moisture resistance reliability | X | | ○ | |

As can be seen from the experimental results in Table 1, specimen No. 1 is a case in which the average Sn content in the side border region of the active portion is smaller than the average Sn content in the central region of the active portion, and it is confirmed that the IR dispersion is large and the electrical characteristics are inferior.

Meanwhile, specimen No. 2 is a case in which the average Sn content in the side border region of the active portion is greater than the average Sn content in the central region of the active portion, and it is confirmed that not only the moisture resistance reliability is excellent, but also the IR dispersion is small and the electrical characteristics are excellent.

In particular, in the specimen No. 1, it is confirmed that, as Sn was diffused a lot toward the first and second side margin parts, the molar ratio of Dy/Sn in the side border margin region Ai of the active portion was 1.75, which was higher than in other regions. In addition, due to excessive diffusion of Sn, the average total content of Sn and Dy in the dielectric layer in the central region Ac of the active portion was less than 2 moles with respect to 100 moles of barium titanate, which is a main component of the dielectric layer.

Meanwhile, the specimen No. 2, the molar ratio of Dy/Sn in the side border region Ai of the active portion satisfies 1.74 or less, and the average total content of Sn and Dy in the dielectric layer in the central region Ac of the active portion satisfied 2 moles or more.

Experimental Example 2

As for specimen No. 2 of Experimental Example 1, a specimen was prepared in the same manner as in Experimental Example 1, except that the average thickness of the dielectric layer of the active portion was changed to a thin film type having a thickness of 400 nm or less, and the average Sn content in the dielectric layer of the active portion was changed as shown in Table 2 below. In addition, the average Sn content in the dielectric layer of the active portion was also measured in the same manner as in Experimental Example 1.

Next, 100 identical sample chips were prepared for each specimen and treated at a temperature of 115° C. and a voltage of 7.56 V for a predetermined period of time, and then the electrical reliability was evaluated by counting the number of chip failures, and the results are shown in Table 2 below.

TABLE 2

| Test specimen No. | No. 3 | No. 4 |
|---|---|---|
| Average Sn content in dielectric layer (Ac + Ai) of active portion with respect to 100 moles of barium titanate as main component of dielectric layer | 0.5 mol % | 1 mol % |
| 24-hour fail % | 10% | 0% |

As can be seen from the experimental results in Table 2, the average Sn content in the dielectric layer of the active portion, in which the average Sn content in the dielectric layer of the active portion is thinned, has a great influence on an electrical reliability result, and the best effect was exhibited when the average Sn content in the dielectric layer of the active portion is 1 mol %.

Experimental Example 3

Specimen No. 2 of Experimental Example 1 was evaluated in the same manner as in Experimental Example 1, except that the average Sn content in the entire dielectric layer of the active portion and the average Sn content in the first and second side margin parts were changed as follows.

TABLE 3

| Test specimen No. | No. 5 | No. 2 |
|---|---|---|
| Average Sn content in dielectric layer (Ac + Ai) of active portion with respect to 100 moles of barium titanate as main component of dielectric layer | 1 mol % | 1 mol % |
| Average Sn content in first and second side margin parts | 1 mol % | 3 mol % |

Through the experiment of Table 3, even in the case of specimen No. 5 in which the ratio of the average Sn content in the first and second side margin parts to the average Sn content in the dielectric layer of the active portion was 1:1, the electrical reliability and moisture resistance reliability were excellent, like specimen No. 2, when tested in the same manner as that of Experimental Example 1.

As set forth above, according to exemplary embodiments in the present disclosure, one of several effects of the present disclosure is to provide a multilayer electronic component having excellent moisture resistance reliability and electrical characteristics.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
   a ceramic body including a dielectric layer and including first and second surfaces opposing each other, third and fourth surfaces connecting the first and second surfaces, and fifth and sixth surfaces connected to the first to fourth surfaces and opposing each other;
   a plurality of internal electrodes disposed inside the ceramic body, connected to the first and second surfaces, and having one ends connected to the third and fourth surfaces; and
   first and second side margin parts disposed on end portions of the internal electrodes connected to the first and second surfaces,
   wherein the ceramic body includes an active portion forming capacitance by including the plurality of internal electrodes disposed to oppose each other with the dielectric layer interposed therebetween, and
   an average Sn content in a region adjacent to the first or second side margin part of the active portion is greater than an average Sn content in a central region of the active portion,
   wherein when a shortest distance from the first side margin part to the second side margin part is t, a side border region of the active portion indicates a region from an interface between any one of the first side margin part and the second side margin part and the active portion to a point of t/10, and
   the central region of the active portion indicates a region excluding the side border region.

2. The multilayer ceramic capacitor of claim 1, wherein an average Dy content in the side border region of the active portion is less than an average Dy content in the central region of the active portion.

3. The multilayer ceramic capacitor of claim 1, wherein a molar ratio of Dy/Sn in the side border region of the active portion is 1.74 or less.

4. The multilayer ceramic capacitor of claim 1, wherein an average Sn content of the dielectric layer in the central region of the active portion is 0.75 moles or more with respect to 100 moles of barium titanate as a main component of the dielectric layer.

5. The multilayer ceramic capacitor of claim 1, wherein the first side margin part and the second side margin part include Sn.

6. The multilayer ceramic capacitor of claim 5, wherein an average Sn content in the first and second side margin parts is 1.0 moles with respect to 100 moles of barium titanate as a main component of the first and second side margin parts.

7. The multilayer ceramic capacitor of claim 5, wherein an average Sn content in the first and second side margin parts is 1 to 3 times an average Sn content in the dielectric layer of the active portion.

8. The multilayer ceramic capacitor of claim 5, wherein an average Sn content in the first and second side margin parts is 1 to 1.5 times an average Sn content in the dielectric layer of the active portion.

9. The multilayer ceramic capacitor of claim 1, wherein an average thickness of the first side margin part and the second side margin part is 2 to 15 μm.

10. The multilayer ceramic capacitor of claim 1, wherein an average total content of Sn and Dy in the dielectric layer of the central region of the active portion is 2 moles or more with respect to 100 moles of barium titanate as a main component of the dielectric layer.

11. The multilayer ceramic capacitor of claim 1, wherein an average Sn content in the dielectric layer of the active portion is 0.8 moles or more with respect to 100 moles of barium titanate as a main component of the dielectric layer.

12. The multilayer ceramic capacitor of claim 1, wherein the multilayer ceramic capacitor satisfies Relational Expression 1 below;

$$W1<W2<W3 \qquad \text{Relational Expression 1,}$$

where when the shortest distance from the first side margin part to the second side margin part is t, W1 represents an Sn content at a point of t/2 from an interface between any one of the first and second side margin parts and the active portion, W2 represents an Sn content at a point of t/10 from an interface between any one of the first and second side margin parts and the active portion, and W3 represents an Sn content at the interface between the first and second side margin parts and the active portion.

13. The multilayer ceramic capacitor of claim 1, wherein an average Sn content in a region adjacent to the side margin part of the dielectric layer is greater than an average Sn content in a central region of the dielectric layer.

14. A multilayer ceramic capacitor comprising:
an active portion having internal electrodes alternately exposed from lengthwise opposing surfaces of the active portion, the internal electrodes being further exposed from widthwise opposing surfaces of the active region, and a dielectric layer separating adjacent internal electrodes in a thickness direction;
external electrodes disposed on the lengthwise opposing surfaces;
side margin parts disposed on the widthwise opposing surfaces,
wherein an average Sn content in a region of the active portion adjacent to the side margin parts is greater than an average Sn content in a central region of the active portion,
wherein a side border region is a region of the active portion between (i) an interface of one of the side margin parts and the active portion and (ii) 1/10 a minimum width of the active portion, and a central region is a region of the active portion at a widthwise center of the active portion.

15. The multilayer ceramic capacitor of claim 14, wherein an average Dy content in the side border region of the active portion is less than an average Dy content in the central region of the active portion.

16. The multilayer ceramic capacitor of claim 14, wherein a molar ratio of Dy/Sn in the side border region of the active portion is 1.74 or less.

17. The multilayer ceramic capacitor of claim 14, wherein an average Sn content of the dielectric layer in the central region of the active portion is 0.75 moles or more with respect to 100 moles of barium titanate as a main component of the dielectric layer.

18. The multilayer ceramic capacitor of claim 14, wherein an average Sn content in the margin parts is 1 to 3 times an average Sn content in the dielectric layer of the active portion.

19. The multilayer ceramic capacitor of claim 14, wherein an average total content of Sn and Dy in the dielectric layer of the central region of the active portion is 2 moles or more with respect to 100 moles of barium titanate as a main component of the dielectric layer.

20. The multilayer ceramic capacitor of claim 14, wherein W1<W2<W3,
wherein W1 is Sn content at ½ the minimum widthwise distance between interfaces of the side margin parts and the active portion, W2 is Sn content at the side margin border region, and W3 is Sn content at the interfaces of the side margin parts and the active region.

21. The multilayer ceramic capacitor of claim 14, wherein an average Sn content in a region of the dielectric layer adjacent to the side margin parts is greater than an average Sn content in a central region of the dielectric layer.

22. A multilayer ceramic capacitor comprising:
a ceramic body including an active portion, and side margin parts disposed on widthwise opposing surfaces of the active portion,
the active portion comprising internal electrodes stacked in a thickness direction with a dielectric layer disposed between adjacent internal electrodes, the internal electrodes being in contact with the side margin parts,
the dielectric layer and the side margin parts comprising Sn, an average Sn content decreasing from an interface between the side margin parts and the active region to a widthwise center of the active region.

23. The multilayer ceramic capacitor of claim 22, wherein an average Sn content of the dielectric layer decreases from an interface between the side margin parts and the active region to a widthwise center of the active region.

* * * * *